United States Patent [19]

Losch

[11] Patent Number: 4,733,957
[45] Date of Patent: Mar. 29, 1988

[54] REARVIEW MIRROR ADJUSTABLE IN TWO PLANES

[75] Inventor: Dieter Losch, Nuremberg, Fed. Rep. of Germany

[73] Assignee: Gebr. Buhler Nachfolger GmbH, Nuremberg, Fed. Rep. of Germany

[21] Appl. No.: 912,369

[22] Filed: Sep. 25, 1986

[30] Foreign Application Priority Data

Oct. 15, 1985 [DE] Fed. Rep. of Germany ....... 3536645

[51] Int. Cl.⁴ ............................ B60R 1/06; G02B 7/18
[52] U.S. Cl. ..................................... 350/636; 350/637; 248/487
[58] Field of Search ............... 350/636, 637, 632, 486, 350/500; 248/487, 479, 476

[56] References Cited

FOREIGN PATENT DOCUMENTS 3407523 8/1985 Fed. Rep. of Germany ...... 350/636

Primary Examiner—Jon W. Henry
Attorney, Agent, or Firm—Mason, Fenwick & Lawrence

[57] ABSTRACT

A rearview mirror for vehicles which is adjustable in two planes and has a mirror housing accommodating the mirror glass, a universal mounting for adjustment of the mirror, and a mounting housing accommodating an adjustment drive mechanism. Two shafts are connected to the adjustment drive mechanism, the shafts being driven directly by the adjustment drive mechanism and being rotatable independently of each other. One of the shafts is connected to the mirror housing so that when that shaft is driven, the mirror is swivelled relative to the housing and the other shaft is rigidly mounted on the framework of the vehicle so that when it is driven the housing mechanism together with the mirror housing is swivelled about the last mentioned shaft.

3 Claims, 3 Drawing Figures

REARVIEW MIRROR ADJUSTABLE IN TWO PLANES

BACKGROUND AND OBJECTS OF THE INVENTION

The present invention relates in general to vehicle rearview mirrors, and more particularly to a vehicle rearview mirror which is adjustable in two planes and a mirror housing accommodating the mirror plane, together with a universal mounting for adjustment of the mirror, and a housing therefor which accommodates adjustment drive mechanisms.

More particularly, the present invention relates to a vehicle rearview mirror which is adjustable in two planes and has a mirror housing accommodating the mirror glass, a universal mounting bringing about the adjustment of the mirror, and a housing for the mounting which accommodates adjustment drive mechanism to which two universal joint shafts are connected, the shafts being driven directly by the adjustment drive mechanism and being movable independently of each other.

A vehicle rearview mirror of this type is known from German patent specification No. 34 07 523 which describes a mirror having a fixed mirror housing, such as are used primarily, as external mirror for motor vehicles. These known mirrors are adjusted by swivelling the mirror glass relatively to the mirror housing and in order to be able to carry out the swivelling movement, one shaft of a universal mounting is connected to the mirror glass, or its support, and the other shaft of the universal mounting is connected to the mirror housing.

Rearview mirrors for vehicles are also known, however, which are adjusted by swivelling the mirror housing; mirrors of this type are used primarily, as internal mirrors for motor vehicles. It is not possible however, to use the design known from German specification No. 34 07 523, for these known mirrors, which are connected by means of a rigid holding arm to the framework of the vehicle, because shadows would form in the inwardly inclining edge region of the mirror glass, which would result in a reduction in the viewing field. In addition, the space required would be considerably increased and the adjusting system introduced of swivelling the whole mirror as a unit would have to be abandoned.

The problem underlying the present invention is to adapt an adjustment drive mechanism having a universal mounting for use even in those rearview mirrors for vehicles in which in the course of their adjustment the entire mirror housing is swivelled.

The problem is solved according to this invention by attaching one shaft of the universal mounting to the mirror housing which, when this shaft is driven, is swivelled relative to the housing of the drive mechanism, and by connecting the other shaft of the universal mounting rigidly to the framework of the vehicle so that when this shaft is driven the housing for the drive mechanism together with the mirror housing is swivelled about this fixed shaft.

As a result of this design described immediately above, the above mentioned disadvantages of the known rearview mirrors for vehicles are avoided. As a consequence of the adjustment of the entire mirror as a unit, there is no relative movement between the mirror glass and the mirror housing so that there is no inward inclination of the mirror glass into the mirror housing with the associated disadvantages. Above all it is advantageous that when used as an internal mirror, the rearview mirror for vehicles according to the invention can, should its electrical drive fail, be adjusted by the driver by hand in the same manner as customary hand adjusted internal mirrors.

BRIEF DESCRIPTION OF THE DRAWINGS

Other objects, advantages and capabilities of the present invention will become apparent from the following detailed description, taken in conjunction with the accompanying drawings, wherein.

DETAILED DESCRIPTION OF A PREFERRED EMBODIMENT

Figure 1:
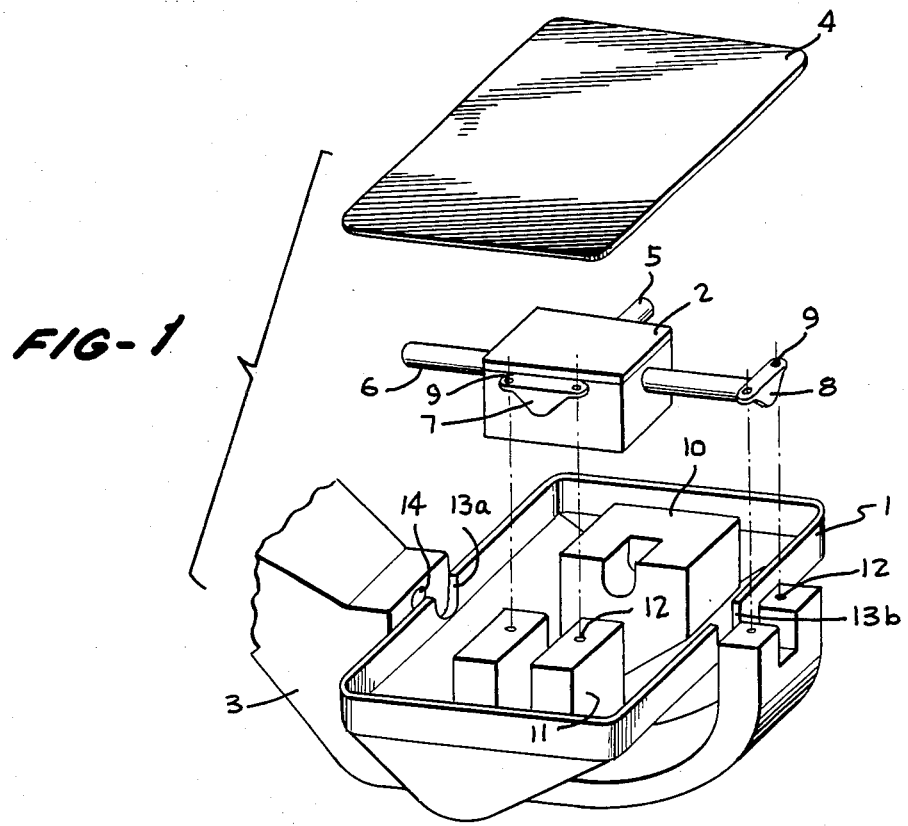
FIG. 1 is an exploded perspective view of a rearview mirror for vehicles, embodying the present invention.

The exploded drawing according to FIG. 1 shows a mirror housing 1, a housing 2 for the drive mechanism, a holding arm 3 and a mirror glass 4. The housing 2 for the drive mechanism forms a universal mounting having two shafts 5 and 6 which extend at right angles to each other and protrude at both sides beyond the external wall of the housing 1. Each of the shafts 5 and 6 is provided at one end with a coupling part 7 and 8, respectively, which has two bores 9. There are arranged inside the mirror housing 1, opposite each other and at a distance from each other, two bearing blocks 10 and 11, of which bearing block 11 is provided with two bores 12. While the upper end (in the drawing) of the shaft 5 is loosely inserted in the bearing block 10 and retained there by a component (not shown), the coupling part 7 of the shaft 5 is rigidly connected to the bearing block 11 by means of fastening means (not shown) (for example, screws) inserted in the bores 9 and 12 which corresponded to each other. In a similar manner the shaft 6 is connected to the holding arm 3, the free end of which is likewise constructed in the manner a bearing block and has bores 12. The lefthand end (in the drawing) of the shaft 6 passes through the wall of the mirror housing 1 at the recess 13a and is loosely pushed into a bore 14 of the holding arm 3; its righthand end (in the drawing) passes through the wall of the mirror housing 1 at the recess 13b and is fastened by the coupling part 8 to the free end of the holding arm 3 by means of fastening means (not shown) inserted in the bores 9 and 12 which correspond to each other.

There are therefore two shafts 5 and 6 mounted in the housing 2 for the drive mechanism or connected thereto, the one shaft 5 being connected to the mirror housing 1 and the other shaft 6 being connected to the holding arm 3 which, for its part, is fixedly attached to the framework of the motor vehicle. Mounted in the housing 2 are a pair of motors having their output shafts connected by gear mechanism to the shafts 5 and 6 respectively. In this case, by actuating the motor associated with the shaft 6, the structural unit comprising the mirror housing 1 and the housing 2 for the drive mechanism and the mirror glass 4 is pivoted about the axis of the shaft 6, there being no relative movement between the components 1, 2 and 4. By actuating the motor associated with the other shaft 5, the structural unit comprising mirror housing 1 and the mirror glass 4 is, in contrast, moved relative to the housing 2 for the drive mechanism which remains stationary.

There are several possibilities for the design of the universal mounting shafts 5 and 6. The shafts 5 and 6 can, for example, lie in one plane; in which case at least one shaft does not go through the housing 2 and this has the advantage that one of the two axle journals can be hollowed in constructions and can accommodate the electrical terminals (or leads). The shafts 5 and 6 can, however, lie also in different planes; in which case the two shafts can be through shafts.

Figure 2:
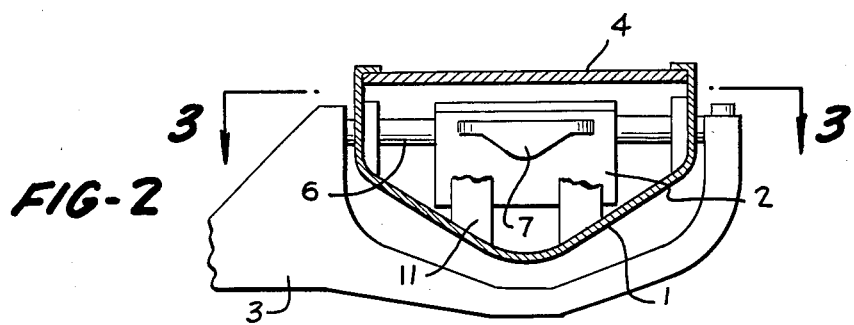
FIG. 2 is a side section view of the rearview mirror according to FIG. 1, taken along the line 2—2 of FIG. 3.
Figure 3:
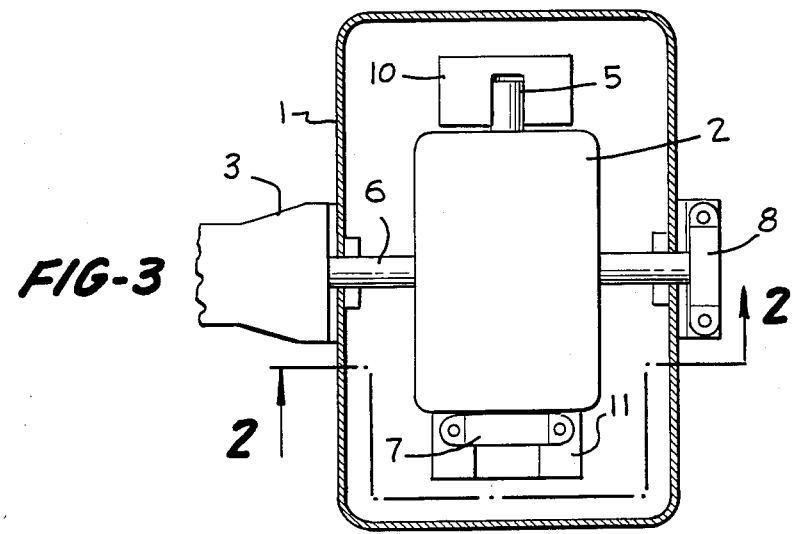
FIG. 3 is a sectional view taken along the line 3—3 of FIG. 2.

FIG. 2 shows the design of the mirror housing 1 and the mirror glass 2 as a self-contained unit and also the holding arm encompassing the mirror housing 1. In addition, FIGS. 2 and 3 show the housing for the drive mechanism in its assembled position.

I claim:

1. In a rearview-mirror for vehicles which is adjustable in two planes and includes a mirror housing accommodating the mirror glass therein, the mirror housing being supported for swivel movement relative to a support to be rigidly connected to a vehicle, the mirror being adjustable by a universal joint having a pair of joint shafts and a drive housing incorporating adjusting drives connected to the pair of joint shafts, the joint shafts being driven directly by the adjusting drives and being relatively independently rotatable; the improvement comprising means connecting a first joint shaft of said pair of joint shafts to the mirror housing whereby when said first joint shaft is driven the mirror housing will be swivelled relative to the drive housing, and means connecting a second joint shaft of said pair of joint shafts of the universal joint to said support such that when said second joint shaft is driven the drive housing will be swivelled together with the mirror housing relative to the support.

2. A mirror according to claim 1 in which said shafts extend completely through the mounting housing for the drive mechanism.

3. A mirror according to claim 1 in which one of said shafts is divided into two parts, one of which is hollow and which accommodates electrical connections to motors forming part of the adjusting drives.

* * * * *